Sept. 19, 1967 F. H. DILL, JR 3,341,937
CRYSTALLINE INJECTION LASER DEVICE MANUFACTURE
Filed Feb. 20, 1963 2 Sheets-Sheet 1
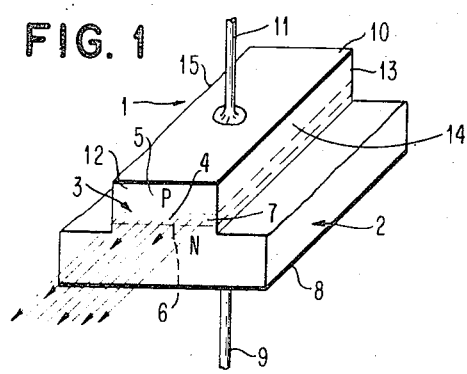
FIG. 1
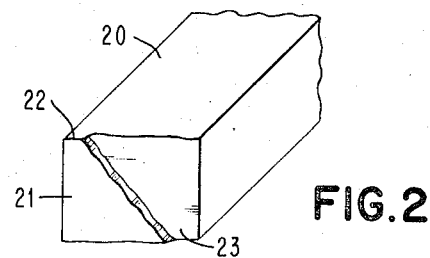
FIG. 2
FIG. 4a
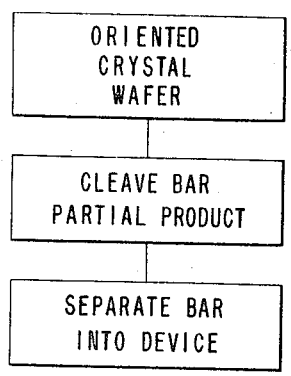
FIG. 4b
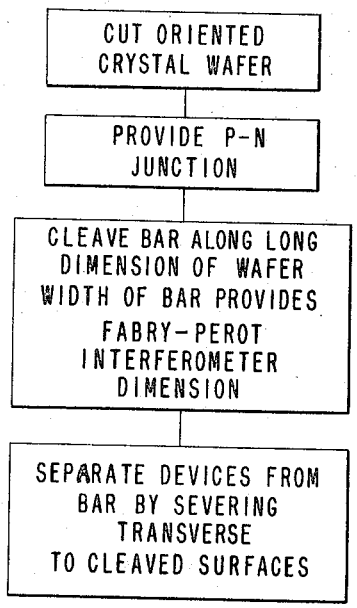
FIG. 4c
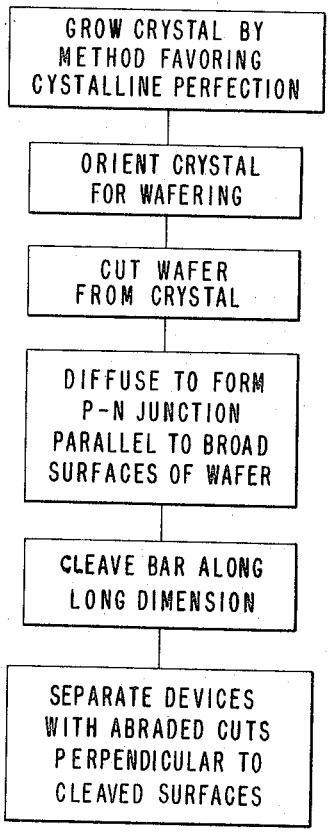
FIG. 3
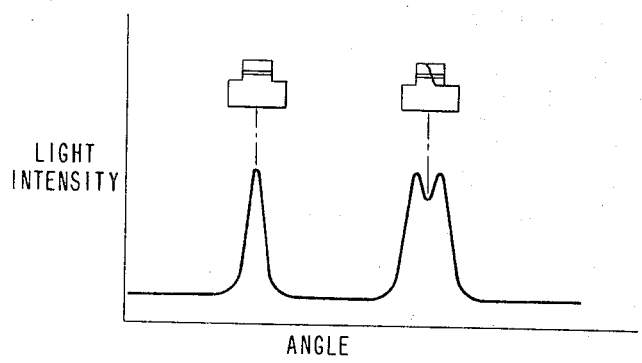
INVENTOR.
FREDERICK H. DILL, JR.
BY
Alvin J. Riddles
ATTORNEY Sept. 19, 1967   F. H. DILL, JR   3,341,937
CRYSTALLINE INJECTION LASER DEVICE MANUFACTURE
Filed Feb. 20, 1963   2 Sheets-Sheet 2
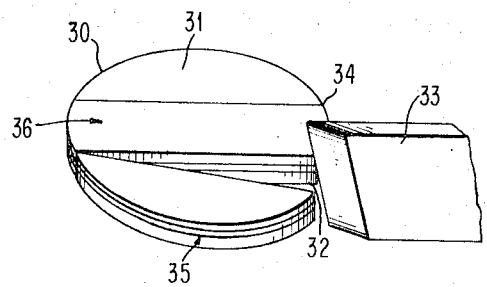
FIG. 5
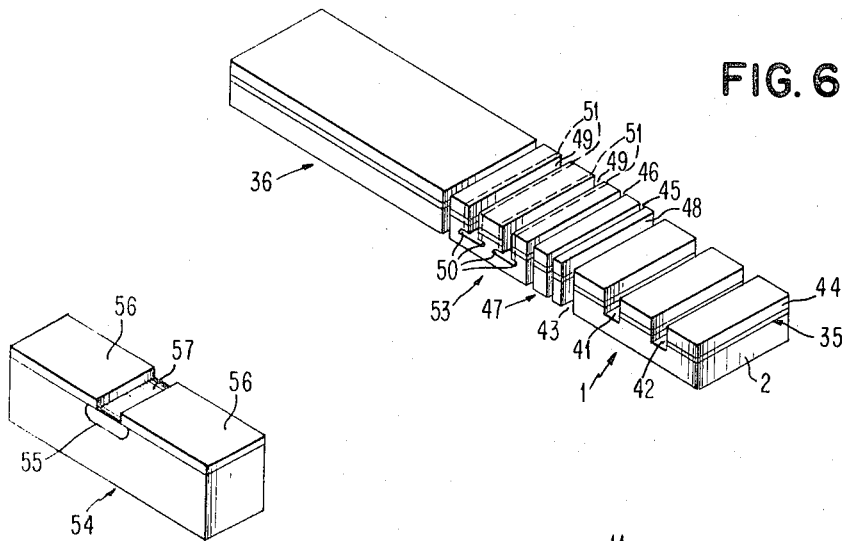
FIG. 6
FIG. 6A
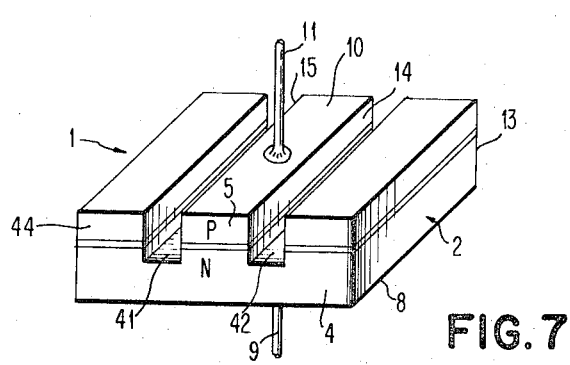
FIG. 7

United States Patent Office 3,341,937
Patented Sept. 19, 1967

3,341,937
CRYSTALLINE INJECTION LASER DEVICE
MANUFACTURE
Frederick H. Dill, Jr., Putnam Valley, N.Y., assignor to International Business Machines Corporation, New York, N.Y., a corporation of New York
Filed Feb. 20, 1963, Ser. No. 260,020
5 Claims. (Cl. 29—583)

This invention relates to the manufacture of crystalline devices wherein the geometrical shape and signal reflecting quality of the surfaces thereof influence the device performance; and, in particular, to such devices that operate to provide monochromatic, coherent light.

Devices wherein electromagnetic energy is caused to undergo a reinforcement or decay, as a result of the reflection from a surface of the device body, are subject to performance criteria that are dependent upon the geometrical relationship of the device surfaces with each other, the precise distances between surfaces, and the electromagnetic energy reflective quality of the surfaces. The physical shape properties of such devices are sometimes referred to as the volumetric geometry of the device.

Devices in which there is light amplification by stimulated emission of radiation, commonly known by the acronym "LASER," are examples of devices which employ volumetric geometry to reinforce electromagnetic energy modes within the device body.

There are, at present, two kinds of solid state "LASERS." The earlier is the optically pumped "LASER" which employs pumping energy in the form of light to establish an electrical carrier population inversion in an environmental crystal into which has been included selected dopants that operate to determine the energy levels between which the electrical carrier transitions occur. Volumetric geometry is employed in these devices in the form of a crystalline shape, with parallel, Fabry-Perot interferometer type, reflective end surfaces and non-reflecting sides that, in combination, confines a particular electromagnetic energy mode to a desired path and causes it to reinforce. These devices require extreme care in fabrication in order to admit the pumping light and yet achieve the required parallelism of the end surfaces and reflection of the coatings thereon.

A more recent development in the art is the "INJECTION LASER." The "INJECTION LASER" is made of a body of an appropriate solid state monocrystalline semi-conductor material having a "p-n" junction therein. When such a device is subjected to current flow of sufficient density in the forward direction, current carriers recombine in a predominant mode and emit coherent, monochromatic light. It has been found that there are many mechanisms, both electrical and optical, that are detrimental to the establishment of a predominant mode and control of these mechanisms has required extremely careful manufacturing techniques. The "INJECTION LASER" employs not only electrical properties in its operation but also its physical shape, and the planarity and geometrical relationship of its surfaces.

In the operation of an "INJECTION LASER," once the injected carriers are present within the crystalline environment in a sufficient density, the volumetric geometry of the device operates to enhance transitions in a selected mode and when a selected mode predominates, the resulting emitted light is coherent and monochromatic. The more transitions that occur in a particular mode, the greater will be the probability that further recombination will occur between energy levels that will enhance that particular mode so that the emission is stimulated.

The injected current density and the volumetric geometry have been found, in the "INJECTION LASER," to be closely interrelated and improved volumetric geometry frequently operates to reduce the current density requirements. Where it is desirable to have highly directional light beams from the device, it is frequently necessary to enhance certain aspects of the volumetric geometry and this is sometimes done at a compromise in injected current density requirements.

As the "INJECTION LASER" art has developed, in a very short period, current density requirements, in order to provide stimulated emission of radiation, have been reduced from earlier values of 10,000 amperes per square centimeter to values approaching 1,000 amperes per square centimeter. The physical size of "INJECTION LASER" devices at the present time are so small, in order to keep the large current density requirements within the capability of available power sources, that advancements in the art of meeting the volumetric geometry requirements are very difficult. To appreciate this fact, a typical device is of the order of 0.002 x 0.004 x 0.010 inch and crystalline imperfections that frequently operate to cause detrimental effects in the ultimate device are only found after much fabrication time has been placed on the device.

The technique of "cleaving," as described in copending application Ser. No. 234,141, filed Oct. 30, 1962, now Patent 3,247,576, issued Apr. 26, 1966, and assigned to the same assignee as this invention and which is incorporate herein by reference, has been found to improve the accuracy and to greatly simplify the satisfying of the volumetric geometry requirements of a device wherein electromagnetic energy is caused to undergo a reinforcement or decay as a result of reflection from a surface of the device.

What has been discovered, in accordance with this invention, is an improved technique for the control of the volumetric geometry in the manufacture of devices wherein electromagnetic energy is caused to undergo a reinforcement or decay as a result of a reflection from a surface of the device, whereby an operation of "cleaving" crystal surfaces is oriented with respect to the entire fabrication process so that the "cleavage" operation occurs on the longest possible crystalline dimension of a partial product from which several devices are later made, and as a result, the superior quality of the "cleaved" plane and its exact geometrical relationship to other "cleaved" surfaces is available as a portion of the volumetric geometry of the ultimate device. The invention, while directed to all crystal device applications, because of the complexity of the interrelationship of optical and electrical properties in these devices, will be described hereinafter predominately in terms of the "INJECTION LASER," although it will be apparent that the principles set forth are useful in the fabrication of all crystal devices. The technique of the invention provides a highly directional, low threshold, "INJECTION LASER" structure and sets forth a structural principle upon which variations of these devices may be built.

It is an object of this invention to provide an improved "cleaved" crystal device.

It is an object of this invention to provide a crystalline device with improved "cleaved" surfaces.

It is an object of this invention to provide an improved "INJECTION LASER."

It is an object of this invention to provide a high yield method of making "INJECTION LASERS."

It is another object of this invention to provide a method of reducing crystal imperfection damage in "cleaving" operations with crystals.

It is another object of this invention to provide an improved method of making "INJECTION LASERS."

It is another object of this invention to provide an improved method of imparting directionality to "INJECTION LASERS."

It is still another object of this invention to provide a structural principle on which variations of "INJECTION LASERS" can be built.

It is still another object of this invention to provide a partial product from which Fabry-Perot interferometer type electromagnetic mode enhancement devices may be made.

The foregoing and other objects, features and advantages of the invention will be apparent from the following more particular description of a preferred embodiment of the invention, as illustrated in the accompanying drawings.

In the drawings:

FIG. 1 is a view of an improved "INJECTION LASER" made in accordance with the invention.

FIG. 2 is an illustration of a defect in a "cleaved" crystal surface.

FIG. 3 is a pictorial graph of light intensity versus angle for two different schematic "INJECTION LASERS," illustrating the effect of crystalline imperfections on the "cleaved" surfaces thereof.

FIGS. 4a, 4b and 4c are flow charts describing the steps involved in the manufacturing process of the invention.

FIG. 5 illustrates the "cleaving" operation along the longest dimension of a crystal wafer.

FIGS. 6 and 6a illustrate the severing of devices from the "cleaved" crystal bar, in accordance with the invention.

FIG. 7 is an illustration of an improved "INJECTION LASER" of the invention, as cut from FIG. 6.

In accordance with the invention, it has been found that the quality of a "cleaved" crystalline surface, for purposes of the volumetric geometry of the device, improves as the "cleaved" separation propagates from the instrument used in effecting the "cleavage."

A crystal, in order to be suitable for "cleaving," must exhibit anisotropy with respect to the stress required to separate portions of the crystal along one crystallographic plane over another. In other words, there must be a favored crystallographic plane for "cleavage." A crystal with such a favored plane may then be "cleaved" by crystallographically orienting the crystal so that the favored plane is separated by the stress applied through forcing a wedge shaped member against the crystal, until the elastic limit is exceeded and a crack appears at that point. Due to the stress concentration at the end of the crack in the crystal, the crack will then propagate through the crystal.

It has been found, in accordance with the invention, that the stress applied in the vicinity of contact of the wedge shaped "cleavage" instrument in the separation operation results in imperfections in the "cleaved" crystal face near where the "cleaved" separation begins and that the quality of the "cleaved" face improves as the "cleavage" propagates away from the point of application of the separating stress. This may be reduced by providing special "cleavage" instrument shapes and notches in the crystal that operate to distribute the required force. The highest quality "cleaved" surfaces are acquired by arranging the process to provide relatively long "cleaved" faces and discarding the portion near where the separation stress was applied.

Referring now to FIG. 1, a schematic view is provided of an "INJECTION LASER" device having a monocrystalline body 1 of an appropriate semiconductor material; for example, gallium arsenide, having a large area base 2 which serves as a heat dissipating member and as a support for the "INJECTION LASER" itself. A "LASER" body 3, epitaxial with the base 2 is positioned above it. The portion 3 is provided with an "n" region 4 provided by selectively doping the crystalline material with, in the gallium arsenide example, selenium and a "p" region 5 made, for example, by the diffusion of a "p" conductivity type impurity, such as zinc, for the material gallium arsenide. The "n" region 4 and the "p" region 5, respectively, form a "p-n" junction 6. A region 7, adjacent the "p-n" junction on the "p" side is shown to illustrate the region from which the monochromatic coherent light is directed.

The device of FIG. 1 is provided with a broad ohmic contact 8, an electrical connection 9, a broad ohmic contact 10 and an electrical connection 11 for application of current from a power source, not shown. The current density required to cause stimulated emission in these devices is currently of the order of 2,500 amperes per square centimeter and when a current of that density is impressed in the forward direction across the "p-n" junction 6, a sufficient density of carriers will exist within the "LASER ACTIVE REGION" 7 that stimulated emission, resulting in monochromatic coherent light, occurs. This light is illustrated schematically by arrows.

The light produced in the "LASER ACTIVE REGION" 7 can be caused to reinforce its particular mode by improvement of the volumetric geometry of the portion 3 of the device. It is desirable that the front surface 12 and rear surface 13 be plane parallel, optically reflecting surfaces, such as will serve as Fabry-Perot interferometer plates. The Fabry-Perot interferometer is well-known in the art and in it the electromagnetic energy is caused to be confined to a precise path between the plates. Where the plates are not parallel even within a portion of a light wavelength, the particular mode to be reinforced walks out of the crystal.

It has been found that where the surfaces 12 and 13 are both "cleaved" exposing the same crystallographic plane, this parallelism requirement is improved and the desired reflectivity is also achieved. It is desirable, in accordance with the invention, that the "cleaved" surfaces 12 and 13 be formed by a "cleavage" operation that propagates some distance from the "cleavage" instrument, as will be later described. The reflectivity of the surfaces 12 and 13 may be even further enhanced with reflective coatings, such as silver. One reflective coating is generally constructed to be about 5% less reflective than the other to permit some light to escape. These coatings have not been shown. Their effect is to reduce current density requirements, but this is done at some sacrifice of electrical energy to light energy conversion efficiency. Reflective coatings on the surfaces 12 and 13 have been found to be desirable for low threshold, highly directional "INJECTION LASERS."

The provision of high quality reflecting surfaces on the surfaces 12 and 13 permits the building up of modes between the end surfaces and highly accurate longitudinal dimensions may be held between parallel, reflecting Fabry-Perot plate structures. Where the surfaces 14 and 15 are also "cleaved," high quality, reflecting properties are achieved from these surfaces and modes involving reflection from these surfaces are reinforced which lowers the current threshold for "LASING." However, for highest directionality, it has been found to be advantageous that the surfaces 12 and 13 be free of certain types of defects, as will be later described, and that surfaces 14 and 15 be of a non-reflecting type so that modes, other than those between the Fabry-Perot type end surfaces, will be suppressed. The suppression of modes, other than the Fabry-Perot modes, may also be achieved by causing only one of the surfaces 14 or 15 to be non-reflecting, since a mode is reinforced by reflection from a plurality of surfaces. The most effective non-reflecting surface for 14 and 15 has been found to be an abrading operation, such as sawing. Suppression of modes reflected from these surfaces can also be affected by an operation such as etching, or one that tends to warp the parallelism of the surfaces 14 and 15, as this tends to cause modes reflected from these surfaces to walk from the active region of the crystal. Vertical walking modes within the active region 7 are absorbed by the crystal material beyond the active region 7.

Since heat is generated at the extremely large current densities required for stimulated emission in these devices, it has been found advantageous, at the lower temperatures of operation such as liquid nitrogen temperature (77° Kelvin), at which temperature the band energy levels of the individual transitions are most clearly defined, to provide a heat sink of the same material as the body of the device, made with a broader area. Such a heat dissipating member is the broader crystal portion 2 of the device of FIG. 1.

The device of FIG. 1 is highly directional and at a low threshold current density emits a beam of light that is coherent, monochromatic and highly intense over a very narrow angle. In accordance with the invention, the "cleavage" operation to provide defect free Fabry-Perot plates must be done so that the "cleavage" separation propagates some distance from the point of stress of the "cleavage" instrument. In the process of constructing devices such as that shown in FIG. 1, in order to have reproducible devices, the entire fabrication process must be oriented around the structures to be achieved; and, in accordance with the invention, it is preferred for devices employing Fabry-Perot plates that a partial product be formed in the shape of a long bar, the transverse dimension of which is the dimension between the Fabry-Perot plates and the sides of the bar is "cleaved," as will be later described.

It has been found in the growth of the crystals, as developed to date, that various crystal growth methods and the hardware, such as furnaces and boats employed therewith, permits some crystalline imperfections and stresses to be found in the ultimate crystal. Such strains and imperfections, when a surface is "cleaved," result in steps in the "cleaved" face, as illustrated greatly exaggerated in FIG. 2. Further, defects in the "cleaved" crystal face resulting from damage at the point near where the "cleavage" separation stress was applied result in steps such as shown in FIG. 2. It should be noted that the type of defect discussed here is much larger than the small lattice scale defects that may permit some light to escape from a "cleaved" surface. The defects discussed here and illustrated in FIG. 2 are sufficiently large to affect the reflecting direction properties of the surface. In FIG. 2, a bar 20 is shown having on a "cleaved" face 21 a step 22 and a lower portion 23. The effect of such a step in a "cleaved" face, even though the thickness of the step 22 is only a few angstroms and cannot be seen except under high magnification, is illustrated in connection with the graph of FIG. 3 wherein the light intensity from the "LASER ACTIVE REGION" 7 of two devices, such as FIG. 1 are compared. One device has a perfect "cleaved" face and the other device has a step in the face, as illustrated in FIG. 2.

In FIG. 3, the light intensity variation, with respect to angle, has a single highly defined peak, in the case of the perfectly "cleaved" crystal face device; and hence, this unit is highly directional and its light beam will not spread over long distances. In contrast to this, the light intensity versus angle for the device with the step in its "cleaved" face shows two peaks and a much broader base; and hence, is not as directional as the first device.

It has been found, in accordance with the invention, that in the fabriiation of devices, it is essential that the entire process of manufacture be oriented so that the "cleaved" dimension, with respect to the location of the "cleavage" instrument be long so that the separation propagates some distance away from the "cleavage" instrument since the quality of the "cleaved" surface improves with the distance from the point of application of the instrument.

Referring next to FIGS. 4a, 4b, 4c, flow charts are provided illustrating the process of the invention and pointing out the formation of the intermediate partial product which takes advantage of the features of the invention with respect to the volumetric geometry of the device.

Referring first to FIG. 4a, a crystal to be fabricated into a device is crystallographically oriented, generally by X-ray diffraction, and cut into wafers, the thickness of which may represent the vertical dimension of an ultimate crystal device. The crystal wafers will have major surfaces which are essentially perpendicular to the crystallographic plane of the particular crystal that requires less stress for separation than other crystallographic planes thereof.

The crystal wafer is next positioned so that a "cleavage" instrument may be applied to the edge. In this step, the wafer is "cleaved" along a long dimension twice to form a bar which is an intermediate partial product in the fabrication of the device. The bar has two parallel "cleaved" surfaces defining one dimension of the ultimate device. The intermediate partial product of this step may then be separated into a plurality of different devices by transverse severing of the bar. It should be pointed out, in accordance with the invention, one of the principal advantages in the fabrication of the intermediate partial product with the long "cleaved" surfaces is that the improvement of the quality of the "cleaved" surfaces, as the separation propagates from the "cleavage" instrument is gained through providing this partial product and this advantage is then imparted to the large number of devices which may then be fabricated with variations in structure, all based on the structural principle of the partial product. This will avoid, in the fabrication of individual devices, having to "cleave" the ends of small individual devices where the "cleavage" separation, due to the fact that the small devices had been completed first, will be close to the "cleavage" instrument.

The second and third steps of the process of FIG. 4a may be seen more clearly in connection with FIG. 5 wherein a wafer 30 is shown having major surfaces 31 and 32 which are cut so as to be crystallographically oriented perpendicular to the plane of minimum stress for "cleavage." A "cleavage" instrument 33, shown schematically as a blade, is illustrated as in the process of "cleaving" a cut 34 by stress applied at the edge of the wafer. The quality of the cut 34 improves as the "cleaved" separation propagates down the crystal wafer 30 away from the blade 33. Two such cuts, parallel to each other, with a separation defining one of the dimensions of the ultimate device, are made in the wafer and the resulting bar shaped partial product is available for separation into other devices. Where the structure to be made is an "INJECTION LASER" of the type of FIG. 1, a "p-n" junction 35 will lie within the crystal wafer.

The crystalline bar partial product is illustrated, in the process of being divided into individual devices in FIG. 6. The individual devices may be made by severing and partially severing the bar transverse to the "cleaved" sides of the bar. Since all the sides of these devices may be involved, the severing may be by sawing, etching or "cleaving" for particular purposes in the ultimate device, as will be later described. The severing may be perpendicular to the "cleaved" faces for alignment of the Fabry-Perot plates or at a selected angle for particular optical property enhancement. In some crystal materials, it is possible to orient the wafer so that the transverse severing may also be done by "cleaving." For example, a gallium arsenide wafer with [100] major surfaces will "cleave" a bar with [110] sides and transverse [110] "cleavages" of the bar may be conducted.

Referring to FIG. 6, the transverse severing is illustrated by cuts 41 and 42 which go part way through the bar to below the "p-n" junction. The cuts 41 and 42 are generally made by a saw or string cutter and will serve to separate an individual device body 3, as shown in FIG. 1. A cut 43, clear through the bar, will then sever the device from the remainder of the bar. It will be apparent that structural variations may be made and many devices may be cut from a single bar.

As a further illustration, FIG. 7 is provided wherein there is illustrated the previously discussed device, similar to FIG. 1, cut from the bar of FIG. 6. The same reference numerals as those used in FIGS. 1 and 6 are employed for identical items.

The only difference between the device illustrated in FIG. 7 and that of FIG. 1 is that the portions 44 of the region 2 have not been removed. These portions 44 do not affect the electrical or optical properties of the device except indirectly by radiating heat and may be removed by further abrading operations or etching, or, as illustrated, where they do not have a detrimental effect on the operation, or are desired for signal introduction purposes, they may be left as they are.

Referring next to FIG. 4b, the process of the invention, as set forth in FIG. 4a is shown in more detail, in which the principles of the invention are employed to fabricate "INJECTION LASER" type devices. In step 1, the crystal is crystallographically oriented, by X-ray diffraction or similar techniques, as previously discussed, so that the wafer may be cut with surfaces that are essentially perpendicular to the crystallographic plane of the crystal that requires a minimum stress for separation and that there be a "p-n" junction in the wafer parallel to the major surfaces. The partial product of the invention with the two perfectly parallel "cleaved" sides is next formed, as described in connection with FIG. 5. The width of the bar 36 of FIG. 6 is the dimension between Fabry-Perot end plates of an "INJECTION LASER." Not only are the "cleaved" faces of better quality but the Fabry-Perot plate separation dimension is identical over many units. The bar is then, as illustrated in FIG. 6, divided into devices by severing transverse to the "cleaved" surfaces. In accordance with the invention, there is now freedom so that the devices severed from the bar 36 may be shaped in a variety of ways and the way that a device is severed may influence the performance of the device. For example, a properly oriented bar 36, such as the gallium arsenide bar "cleaved" from a wafer with [100] broad faces, having [110] "cleaved" sides previously mentioned, may be "cleaved" along faces 45 and 46 to provide all "cleaved" faces for the resulting device 47 so as to achieve a lower threshold current. This may result in an "INJECTION LASER" in which the coherent light does not emerge in a directional beam. In FIG. 6, a portion 48 is shown which was removed to separate the type of cut 43 from affecting the optical properties of the device 47. In actual practice of the invention, all the same type of devices are generally made in one bar so that there is little discarded material.

As another example, several devices may be made in a single element having the output thereof influencing each other. Such devices are described and claimed in co-pending application, Ser. No. 248,380, filed Dec. 31, 1962, now Patent No. 3,257,626, assigned to the assignee of this application and incorporated herein by reference. In these devices slots 48 and 49 are cut below the "p-n" junction 35 and the slots are then shaped to provide undercuts 50 below the active part of the crystal containing the junction 35 and the future active region 7. The overhanging portions are then "cleaved" along the dotted lines 51 to provide a device with "cleaved" faces having the active regions 7 precisely aligned. Another cut 52 is then made to sever the element 53 from the bar 36.

Still another example may be seen in connection with device 54, in FIG. 6a, wherein a specially shaped junction is provided by diffusing through a mask. The junction 55 of the device 54 extends under a mask 56 and is formed preferably by diffusing into the crystal through an opening 57. The "cleaved" sides of the bar 36 provide the Fabry-Perot interferometer plates of the device 54. It will be apparent here that because of the special shape of the "p-n" junction 55 that the "p-n" junctions may either be formed through a number of simultaneous diffusions through masks with slits on a wafer, such as shown in FIG. 5, wherein the slits are perpendicular to the direction of the "cleavage" separation 32 or they may be formed after the bar is fabricated, as shown in FIG. 6a by use of appropriate masking. In all of the above examples, the partial product bar having precisely "cleaved" sides serves as a source of many devices with Fabry-Perot interferometer end plates.

In order to provide one skilled in the art with a starting place in a technology, such as that of the instant invention, a detailed set of steps in the process of the invention employed in the manufacture of a highly directional "INJECTION LASER" are provided herewith, although, in accordance with the principles of the invention, it will be apparent to one skilled in the art that, from the teaching set forth herein, many such sets of specifications can be provided.

Referring next to FIG. 4c, the crystal, preferably of gallium arsenide, grown by techniques, such as the Czochralski or the horizontal Bridgeman method, both well-known in the art, is formed in a crystallographic direction related to the growth hardware employed that crystalline perfection is favored. It has been found for the material gallium arsenide that when the crystal is pulled in the [100] or [111] crystallographic direction, imperfections do not tend to propagate through the crystal, but that when pulled in the [100] crystallographic direction, less perfect crystals result. However, it should be cautioned that all reasons for this effect have not been established at this state of the art and that the effect observed may be due to individual growth equipment differences. It has been established, though, that for an individual assembly of crystal growing equipment, there is generally a preferred crystallographic plane for growth and this should be employed.

The crystal is next oriented, generally by X-ray diffraction techniques well-known in the art, so that the location of the preferred plane requiring the least stress for separation is established.

The crystal is next cut into wafers having the broad surfaces thereof perpendicular to the crystallographic plane of the crystal requiring the least stress for separate. The wafers are generally provided with a thickness that is related to the total length of the "cleavage" cut so that the stress when the blade or other "cleavage" instrument is applied to begin the "cleavage" operation does not excessively damage the crystal at that point. For the material gallium arsenide with a crystal wafer approximately one inch in diameter and a blade sharpened to an edge of about 0.0001 inch, a crystal wafer thickness of about 0.020 inch is satisfactory.

The wafer is next provided with a "p-n" junction parallel to the surfaces, generally this is accomplished by diffusing into the wafer through the major surfaces, thus placing a broad "p-n" junction parallel to the crystal face, or as described in connection with FIG. 6a the junction is placed through any desired masking configuration. Where the gallium arsenide crystal is originally "n" type having been doped with an impurity such as selenium, the diffusion of zinc into one surface thereof will provide a good "p-n" junction for "INJECTION LASER" purposes. In order to facilitate later cutting operations, the depth of the "p-n" junction should be recorded with respect to at least one surface. The "p-n" junction location is generally determined by etching or probing as is well-known in the art.

It will be apparent to one skilled in the art that as long as the wafer contains the "p-n" junction, as schematically illustrated in FIG. 5, although as shown in FIG. 6a it may be a series of specially shaped junctions, the order of the introduction of the "p-n" junction is not essential and hence, the junction may be grown as the crystal is formed, and its location established so that it may be included in the wafer. It is important only that the junction be present in the "cleaved" bar when severing into devices takes place. To provide the highly directional "INJECTION LASER" of the invention the "p-n" junction is diffused into the wafer to a depth of approximately 0.001 inch.

The wafer is then "cleaved" into the bar, as described in connection with FIG. 5. The width of the bar provides a precise device dimension. The bar width serves as the dimension between Fabry-Perot type interferometer end plates of the device. This dimension may be held to approximately two and one-half microns or approximately 0.0001 inch. Since many devices may be cut from the bar, with the technique of the invention, all the devices have this dimension identical and hence are highly reproducible. It is considered that a single crystal will provide approximately fifty wafers, and that each wafer, when cut into several bars, will provide 200 devices of the type shown in FIG. 1. Where there is damage adjacent to the point of application of the "cleavage" instrument this portion of the bar may be discarded. Where the length of the "cleaved" bar face is several times the width of the devices severed therefrom, high quality device faces are achieved.

In accordance with the invention it will also be apparent that rejects and unsatisfactory devices that occur as a result of the "cleavage" operation may be examined while in the long bar and before further fabrication is directed thereto.

The long bar having the "cleaved" sides serving as Fabry-Perot end plates is now severed into a plurality of devices by cuts perpendicular to the "cleaved" sides of the bar. The cuts that serve as the sides of the "INJECTION LASER" are abraded to a depth below the "p-n" junction so that modes reflected from these sides do not return to the crystal. The broader base of the crystal is epitaxial with the "n" region of the active portion of the device and serves as a heating radiating member.

To further assist one skilled in the art in practice of the invention, a device of the type illustrated in connection with FIGS. 1 and 7, made in accordance with the process of FIG. 4c is described in detail below:

| | |
|---|---|
| Crystal | Gallium arsenide. |
| "n" Region | Selenium-doped to $1 \times 10^{18}$. |
| "p" Region | Zinc-doped, diffused impurity density $2 \times 10^{19}$ at the surface. |
| "p-n" Junction | 0.001 inch, below surface dimension. |
| Between "cleaved" surfaces | 0.010 inch width. |
| Between sides of active device | 0.002 inch. |
| "Cleaved" surfaces | Silvered-one having 5% less reflectivity than other. |
| Current threshold density | 120 milliamperes at 77° K., corresponding to 1000 amperes per square centimeter. |

What has been described is a method of fabricating crystalline devices wherein the volumetric geometry of the device is of importance because electromagnetic energy is caused to decay or be reinforced as a result of reflection from a surface thereof. In accordance with the invention, the crystal growth process is arranged so that a crystalline bar may be "cleaved" from a wafer of the crystal and the bar may serve as a partial product having "cleaved" sides that will be the end dimension of a plurality of elongated devices cut therefrom.

While the invention has been particularly shown and described with reference to a preferred embodiment thereof, it will be understood by those skilled in the art that various changes in form and details may be made therein without departing from the spirit and scope of the invention.

What is claimed is:

1. A method of making accurately reproducible electro-optical device crystalline bodies comprising the steps of:
    providing a crystal wafer having the distance between the broad surfaces thereof defining one device dimension, said broad surfaces being essentially perpendicular to a crystallographic plane of the particular crystal material of said wafer that requires less force for separation than other crystallographic planes of said particular crystallographic material;
    forming by two parallel "cleaving" operations a bar out of said wafer; the width dimension of said bar defining a second dimension of the ultimate device; and,
    dividing said bar into individual devices by severing perpendicular to the "cleaved" sides of said bar.

2. A method of forming "INJECTION LASERS" comprising:
    providing a crystal wafer of semiconductor material containing a "p-n" junction parallel to the major surfaces thereof, said major surfaces, in turn, being perpendicular to the crystallographic plane of said semiconductor material that requires the minimum stress for separation;
    "cleaving" a bar by two parallel operations out of said wafer, forming thereby a crystal bar with parallel "cleaved" sides, the distance between the "cleaved" sides thereof defining the longest dimension of the "INJECTION LASER" being fabricated; and,
    separating devices from said bar by severing perpendicular to said "cleaved" surfaces.

3. A method of forming "INJECTION LASERS" comprising:
    providing a crystal wafer of semiconductor material containing a "p-n" junction parallel to the major surfaces thereof, said major surfaces, in turn, being perpendicular to the crystallographic plane of said semiconductor material that requires the minimum stress for separation;
    "cleaving" a bar by two parallel operations out of said wafer, forming thereby a crystal bar with parallel "cleaved" sides, the distance between the "cleaved" sides thereof defining the longest dimension of the "INJECTION LASER" being fabricated; and,
    separating devices from said bar by abrading perpendicular to said "cleaved" surfaces.

4. The process of providing directional "INJECTION LASER" structures comprising:
    growing a crystal suitable for "INJECTION LASERS" and exhibiting a stress anisotropy suitable for "cleavage";
    positioning said crystal so that the direction of at least one preferred "cleavage" plane is established;
    cutting a wafer from said crystal with the broad faces thereof in crystallographic orientation so that it may be "cleaved" by a stress applied to the edge thereof;
    diffusing to form a "p-n" junction in said wafer;
    "cleaving" at least one bar from said wafer in a direction corresponding to the longer dimension across said wafer;
    separating at least one device from said bar by at least one abraded cut perpendicular to the "cleaved" surfaces thereof.

5. The process of providing a directional "INJECTION LASER" structure comprising:
    positioning a gallium arsenide crystal so that the direction of at least one preferred "cleavage" plane is established;
    cutting a wafer from said crystal with the broad faces thereof in a crystallographic orientation so that portions may be "cleaved" by a stress applied to the edge thereof;

diffusing to form a "p-n" junction in said wafer parallel to said broad surfaces;

"cleaving" at least one bar from said wafer;

sawing two cuts through the bar to a depth below the "p-n" junction;

severing a device by removing the portion of the bar including at least the region between the two saw cuts; and providing electrical contacts to the uncut side of the device and at least to the portion of the device between the two saw cuts.

References Cited

UNITED STATES PATENTS

| | | | |
|---|---|---|---|
| 3,122,827 | 3/1964 | Jepson | 29—423 |
| 3,128,213 | 4/1964 | Gault | 29—155.5 X |
| 3,152,939 | 10/1964 | Bornemann | 156—3 |
| 3,193,418 | 7/1965 | Cooper | 148—189 |
| 3,245,002 | 4/1966 | Hall | 331—94.5 |
| 3,247,576 | 4/1966 | Dill | 29—155.5 |

WILLIAM I. BROOKS, *Primary Examiner.*